United States Patent
Pape et al.

(10) Patent No.: US 11,215,489 B2
(45) Date of Patent: Jan. 4, 2022

(54) APPARATUS AND METHOD FOR MEASURING THE FLOW VELOCITY OF A FLUID IN A PIPE

(71) Applicant: ABB Schweiz AG, Baden (CH)

(72) Inventors: Detlef Pape, Nussbaumen (CH); Philipp Nenninger, Karlsruhe (DE); Miklos Lenner, Baden-Daettwill (CH)

(73) Assignee: ABB SCHWEIZ AG, Baden (CH)

( * ) Notice: Subject to any disclaimer, the term of this patent is extended or adjusted under 35 U.S.C. 154(b) by 223 days.

(21) Appl. No.: 16/561,139

(22) Filed: Sep. 5, 2019

(65) Prior Publication Data
US 2019/0390991 A1 Dec. 26, 2019

Related U.S. Application Data
(63) Continuation of application No. PCT/EP2018/055148, filed on Mar. 2, 2018.

(30) Foreign Application Priority Data
Mar. 7, 2017 (EP) .................................... 17159550

(51) Int. Cl.
*G01F 1/66* (2006.01)
(52) U.S. Cl.
CPC .............. *G01F 1/667* (2013.01); *G01F 1/662* (2013.01)
(58) Field of Classification Search
CPC ................................ G01F 1/662; G01F 1/667
See application file for complete search history.

(56) References Cited

U.S. PATENT DOCUMENTS

| 4,024,760 A * | 5/1977 | Estrada, Jr. | ............... G01F 1/66 73/861.31 |
| 4,109,523 A * | 8/1978 | Teyssandier | ............ G01F 1/667 73/861.31 |

(Continued)

FOREIGN PATENT DOCUMENTS

| CN | 1118190 A | 3/1996 |
| CN | 102589622 A | 7/2012 |

(Continued)

OTHER PUBLICATIONS

Chul-Ho Lee et al: "An implementation of ultrasonic water meter using dToF measurements", Cogent Engineering, vol. 4, No. 1, Aug. 29, 2017 (Aug. 29, 2017), XP055477650.

(Continued)

*Primary Examiner* — Manuel A Rivera Vargas
*Assistant Examiner* — Yaritza H Perez Bermudez
(74) *Attorney, Agent, or Firm* — Leydig, Voit & Mayer, Ltd.

(57) ABSTRACT

An apparatus for measuring a flow velocity of a fluid in a pipe includes: a housing in which a first ultrasonic transducer and a second ultrasonic transducer are arranged at a predefined distance to each other, the first ultrasonic transducer including a first sound transmitting element and a transmitter/receiver unit mounted thereto which emit first ultrasonic pulses at different angles, the second ultrasonic transducer receiving the first ultrasonic pulses and generating a first electronic output signal, the second ultrasonic transducer including a second sound transmitting element and a transmitter/receiver unit mounted thereto which emit second ultrasonic pulses at different angles, the first ultrasonic transducer receiving the second ultrasonic pulses and generating a second electronic output signal; and a control and evaluation unit electrically coupled to the first and second transducers, the control and evaluation unit tuning (Continued)

the first transducer to generate a first electronic output signal of a maximum amplitude.

18 Claims, 11 Drawing Sheets

(56) References Cited

U.S. PATENT DOCUMENTS

| | | | | |
|---|---|---|---|---|
| 4,317,178 | A * | 2/1982 | Head | G01F 1/00 |
| | | | | 702/47 |
| 4,432,243 | A * | 2/1984 | Lowell | G01F 1/66 |
| | | | | 702/48 |
| 4,839,824 | A * | 6/1989 | Ando | G01B 11/245 |
| | | | | 348/139 |
| 5,251,487 | A | 10/1993 | Marshall | |
| 5,533,408 | A | 7/1996 | Griessmann et al. | |
| 6,067,861 | A * | 5/2000 | Shekarriz | G01F 1/663 |
| | | | | 367/89 |
| 6,098,467 | A * | 8/2000 | Wallen | G01F 1/667 |
| | | | | 73/861.28 |
| 6,158,288 | A * | 12/2000 | Smith | G01F 1/667 |
| | | | | 73/861.25 |
| 6,595,071 | B1 * | 7/2003 | Doten | A61B 8/06 |
| | | | | 73/861.29 |
| 6,644,128 | B1 | 11/2003 | Byatt | |
| 8,573,026 | B2 * | 11/2013 | Froehlich | G01F 25/0007 |
| | | | | 73/1.34 |
| 9,279,707 | B2 * | 3/2016 | Wiest | G01F 1/662 |
| 10,371,551 | B2 * | 8/2019 | Mei | G01F 1/663 |
| 10,801,868 | B2 * | 10/2020 | Dabak | G01F 1/662 |
| 2007/0151364 | A1 | 7/2007 | Wiest et al. | |
| 2010/0299088 | A1 * | 11/2010 | Huang | G01F 15/08 |
| | | | | 702/48 |
| 2012/0144930 | A1 * | 6/2012 | Aughton | G01F 1/667 |
| | | | | 73/861.28 |
| 2012/0160032 | A1 | 6/2012 | Habersetzer et al. | |
| 2012/0271568 | A1 * | 10/2012 | Wilson | G01F 1/668 |
| | | | | 702/48 |
| 2013/0080081 | A1 * | 3/2013 | Dugger | G01F 1/663 |
| | | | | 702/48 |
| 2014/0107950 | A1 * | 4/2014 | Dabak | G01F 1/66 |
| | | | | 702/48 |
| 2015/0160053 | A1 * | 6/2015 | Baumoel | B06B 1/0215 |
| | | | | 73/861.28 |
| 2016/0061778 | A1 * | 3/2016 | Kishiro | G01N 29/024 |
| | | | | 73/597 |
| 2016/0305805 | A1 * | 10/2016 | Baumoel | G01F 1/663 |
| 2017/0273658 | A1 * | 9/2017 | Wang | A61B 8/5223 |
| 2021/0033440 | A1 * | 2/2021 | Savery | G01S 15/8984 |

FOREIGN PATENT DOCUMENTS

| | | |
|---|---|---|
| CN | 105181997 A | 12/2015 |
| CN | 106153132 A | 11/2016 |
| EP | 3115753 A1 | 1/2017 |
| EP | 3115755 A1 | 1/2017 |
| GB | 2504297 A | 1/2014 |
| JP | S 6098313 A | 6/1985 |
| JP | H 06281663 A | 10/1994 |
| JP | 2001133306 A | 5/2001 |

OTHER PUBLICATIONS

Sherri Kappler et al, "Evaluation of stroke volume via arterial pulse pressure waveforms in neonatal lambs," Biology of the Neonate, Jul. 2004, pp. 184-194, Karger , Basel, Switzerland.

Haichao Cai,"Research on Theory and Key Technologies of Ultrasonics Guided Waves for Pipe-like Structures," Jun. 2016, pp. 1-149, China Academic Journals Electronic Publishing House, China.

* cited by examiner

APPARATUS AND METHOD FOR MEASURING THE FLOW VELOCITY OF A FLUID IN A PIPE

CROSS-REFERENCE TO PRIOR APPLICATION

This application is a continuation of International Patent Application No. PCT/EP2018/055148, filed on Mar. 2, 2018, which claims priority to European Patent Application No. EP 17159550.7, filed on Mar. 7, 2017. The entire disclosure of both applications is hereby incorporated by reference herein.

FIELD

The invention is related to an apparatus and a method for measuring the flow velocity of a fluid in a pipe.

BACKGROUND

Ultrasonic flow meters are commonly used for measuring the volume flow of different fluid media in many industrial applications. Especially clamp-on ultrasonic flow meters are very convenient and flexible to use because they can be mounted without opening the pipe and without interruption of the process.

For mounting clamp-on ultrasonic flow meters, two transducers for emitting and receiving ultrasonic signals are mounted on outer surface of the pipe. The transducers are emitting ultrasonic signals under a fixed angle through the pipe. To do so, the transducers are arranged on the same side of the pipe at such a distance to each other that the second transducer receives the signal emitted by the first transducer and reflected at the opposite pipe wall and vice versa. Also variants exist were the transducers are arranged on opposite sides of a pipe but in a certain distance along the pipe axis and the signal transmitted straight through the pipe is detected. This avoids signal losses due to the reflection but generates a higher installation effort. The measurement principle for both configurations is the same.

Due to the emitting of the sound under a fixed angle, the transducers have to be arranged in a specific way which is determined by the emitted beam angle and the dimension of the pipe, in particular the pipe diameter and the wall thickness. These parameters are varying strongly from pipe to pipe and are not known a priori. Therefore, the transducers cannot be arranged in fixed installations already during the production process but have to be manually adjusted on-site by the user. This generates a high effort for the user during the sensor installation. Also a wrong mounting of the transducers can result in significant measurement errors of the sensor or even a failure of the sensor operation. Due to these requirements and problems during the sensor installation, clamp-on flow meters gained a low reputation although they provide the advantage of a non-intrusive mounting and operation of the sensor.

To gain a strong signal of an ultrasonic flow meter which is of great importance for obtaining a high accuracy of the measurements carried out afterwards, it is of advantage to focus the ultrasonic beam as good as possible onto the second transducer, in order to lose as less as possible of the signal. However, a precise focusing of the transmitter and receiver requires an even higher accuracy of the positioning of the transmitter and receiver during sensor installation.

Moreover, a further problem of the known prior art clamp-on flow meters can be seen in that the beam angle is changed by different flow rates of the medium flowing inside the pipe. Therefore, the focusing of the beam is limited to an area which is large enough to allow the flow sensor to operate under all conditions. In other words, the focusing area of the known clamp-on fixed beam angle flow meters has to be large enough to cover all flow rates speeds which the medium flowing through the pipe may have.

To avoid the change of the beam angle by the flow rate, EP 3 115 753 A1 of the applicant proposes an ultrasonic transmitter/transducer for measuring the filling level in a vessel which allows the emitted beam angle to be electronically controlled, in order to adapt the emitter/transducer to different conditions. To do so, the ultrasonic transducers, e.g. known piezo transmitters, are mounted at the outer surface of the pipe by means of plastic wedges which cause the wall material of the pipe which is contacted by the associated surfaces of the wedges to emit ultrasonic waves at an angle which strongly depends on the excitation frequency of the emitter/transducer. By tuning the excitation frequency, the beam angle of the wave package generated in and emitted from the pipe wall to the inside of the pipe can be altered.

Although EP 3 115 753 A1 discloses transmitters/transducers for generating an ultrasonic beam which is emitted at a variable beam angle into a vessel, the document is silent about measuring the height of a liquid or the volume flow of a liquid flowing through a pipe having a circular cross section with a high precision in a simple way without knowing the diameter and the wall thickness of the pipe, as well as the properties of the liquid.

SUMMARY

In an embodiment, the present invention provides an apparatus for measuring a flow velocity of a fluid in a pipe, comprising: a housing in which a first ultrasonic transducer and a second ultrasonic transducer are arranged at a predefined distance to each other, the first ultrasonic transducer including a first sound transmitting element and a transmitter/receiver unit mounted thereto which are configured to emit first ultrasonic pulses at different angles, the second ultrasonic transducer being configured to receive the first ultrasonic pulses and generate a first electronic output signal, the second ultrasonic transducer including a second sound transmitting element and a transmitter/receiver unit mounted thereto which are configured to emit second ultrasonic pulses at different angles, the first ultrasonic transducer being configured to receive the second ultrasonic pulses and generate a second electronic output signal; and a control and evaluation unit electrically coupled to the first and second transducers, the control and evaluation unit being configured to tune the first transducer to generate a first electronic output signal of a maximum amplitude, and tune the second transducer to generate a second electronic output signal of a maximum amplitude, wherein the control and evaluation unit is configured to measure a flight time of the first ultrasonic pulses and a time of flight of the second ultrasonic pulses travelling between the first and second transducer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
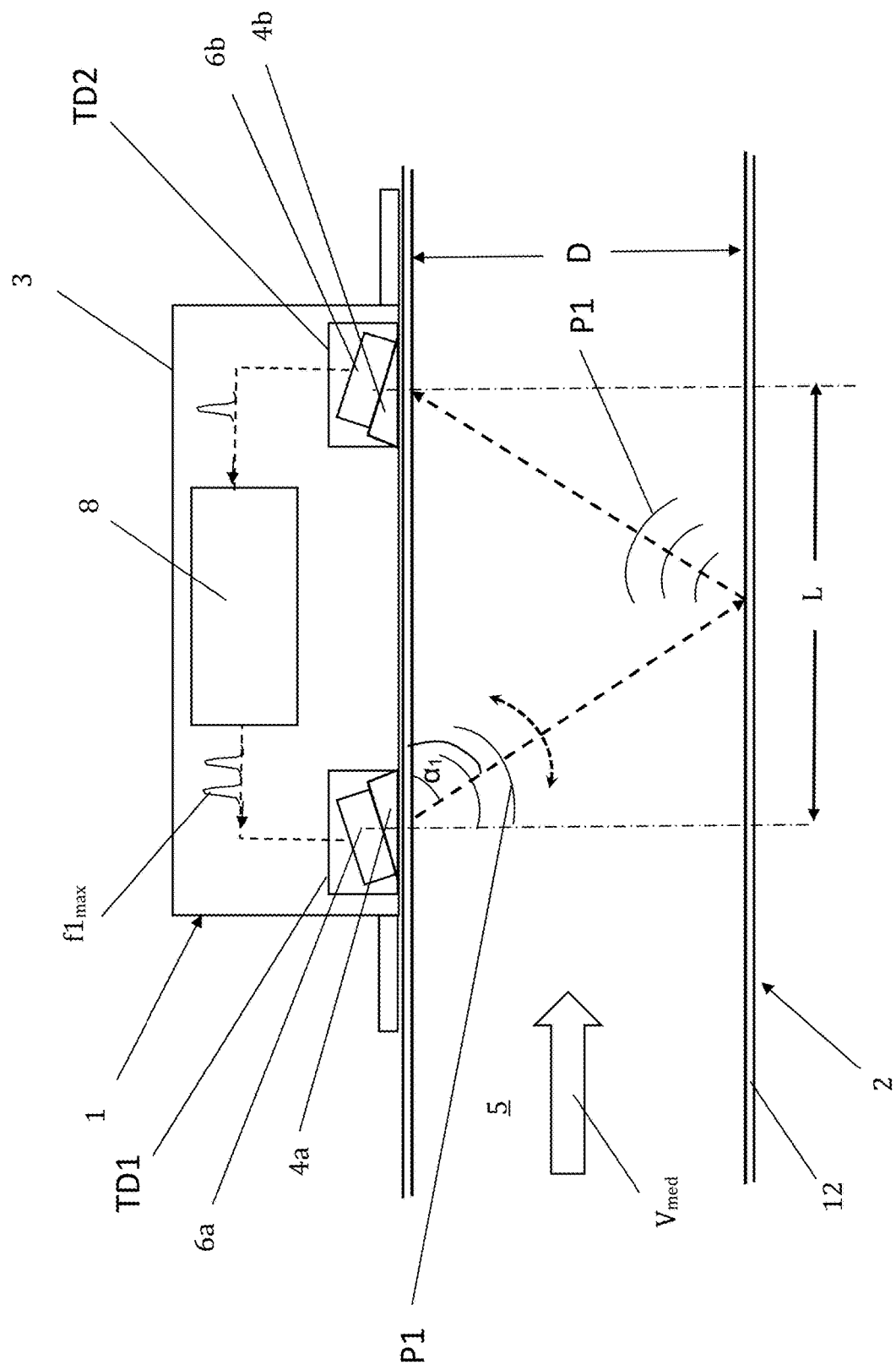
FIG. 1 is a schematic side view of a completely filled pipe in which a fluid is streaming with a clamp-on apparatus according to the present invention in which first ultrasonic pulses are emitted by a first transducer which are received by a second transducer.

Accordingly, in an embodiment, the present invention provides an apparatus which allows a non-intrusive measurement of the flow velocity, the volume flow and the filling height of a fluid running through a pipe having an unknown diameter.

Moreover, it is a further problem of the present invention to provide for a method which allows a quick and easy non-intrusive determination of the flow velocity, the diameter and the volume flow as well as the filling height of a fluid in a pipe having an unknown diameter or radius.

As it is shown in FIGS. 1 to 6, an apparatus 1 for measuring the flow velocity $V_{med}$ of a fluid 5 in a pipe 2 which is herein after also called flow meter 1, comprises a housing 3 in which a first ultrasonic transducer TD1 and a second ultrasonic transducer TD2 are arranged at a predefined distance L to each other. The first ultrasonic transducer TD1 includes a first sound transmitting element 4a and a transmitter/receiver unit 6a which are adapted to emit first ultrasonic pulses P1 at different angles $\alpha_1$. The second ultrasonic transducer TD2 is adapted to receive the first ultrasonic pulses P1 and generate a first electronic output signal. In the same way, the second ultrasonic transducer TD2 includes a second sound transmitting element 4b and a second transmitter/receiver unit 6b mounted thereto which are adapted to emit second ultrasonic pulses P2 at different angles α2. The first ultrasonic transducer TD1 is adapted to receive the second ultrasonic pulses P2 and generate a second electronic output signal. The first and second transducer TD1 and TD2 are connected to a control and evaluation unit 8 which drives both transducers TD1 and TD2 when operated in a transmitting mode and also evaluates the signals received by the transducers, when operated in a receiving mode.

As it is shown in FIG. 1, the control and evaluation unit 8 is adapted to vary the angle $\alpha_1$ of the ultrasonic pulses P1 which are emitted by the first transducer TD1 when operated in the transmitting mode to an angel which generates a first electronic output signal in the second transducer TD2 that has a maximum amplitude.

In the same way, the control and evaluation unit 8 is adapted to vary the angle $\alpha_2$ of the second ultrasonic pulses which are emitted by the second transducer TD2 when operated in a transmitting mode to an angle which generates an electronic output signal in the first transducer TD1 that has a maximum amplitude.

Figure 2:
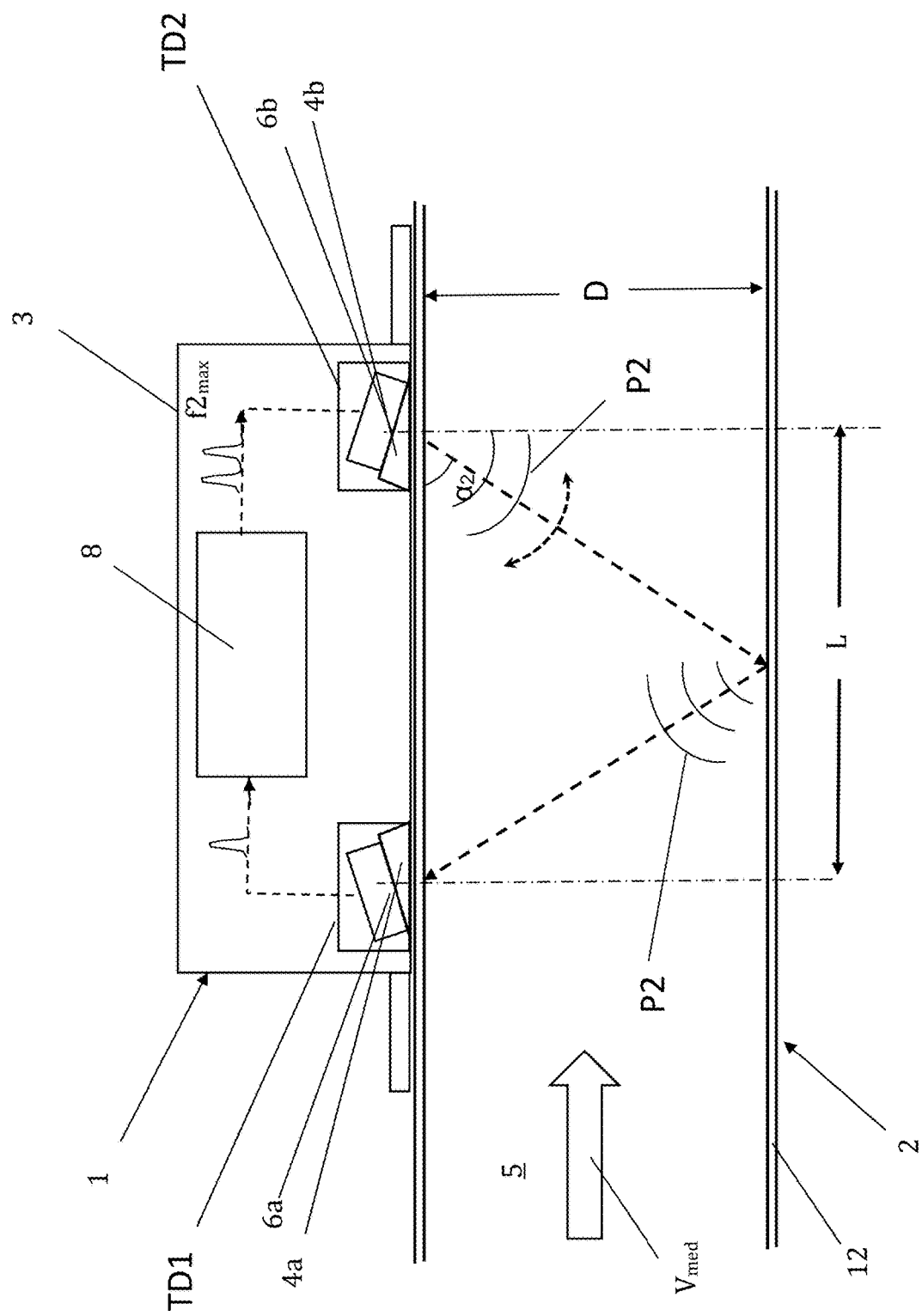
FIG. 2 is the pipe of FIG. 1 in which second ultrasonic pulses are emitted by the second transducer which are received by the first transducer, in order to illustrate the general principle of measuring the speed of the fluid and the volume flow with the apparatus.
Figure 7:
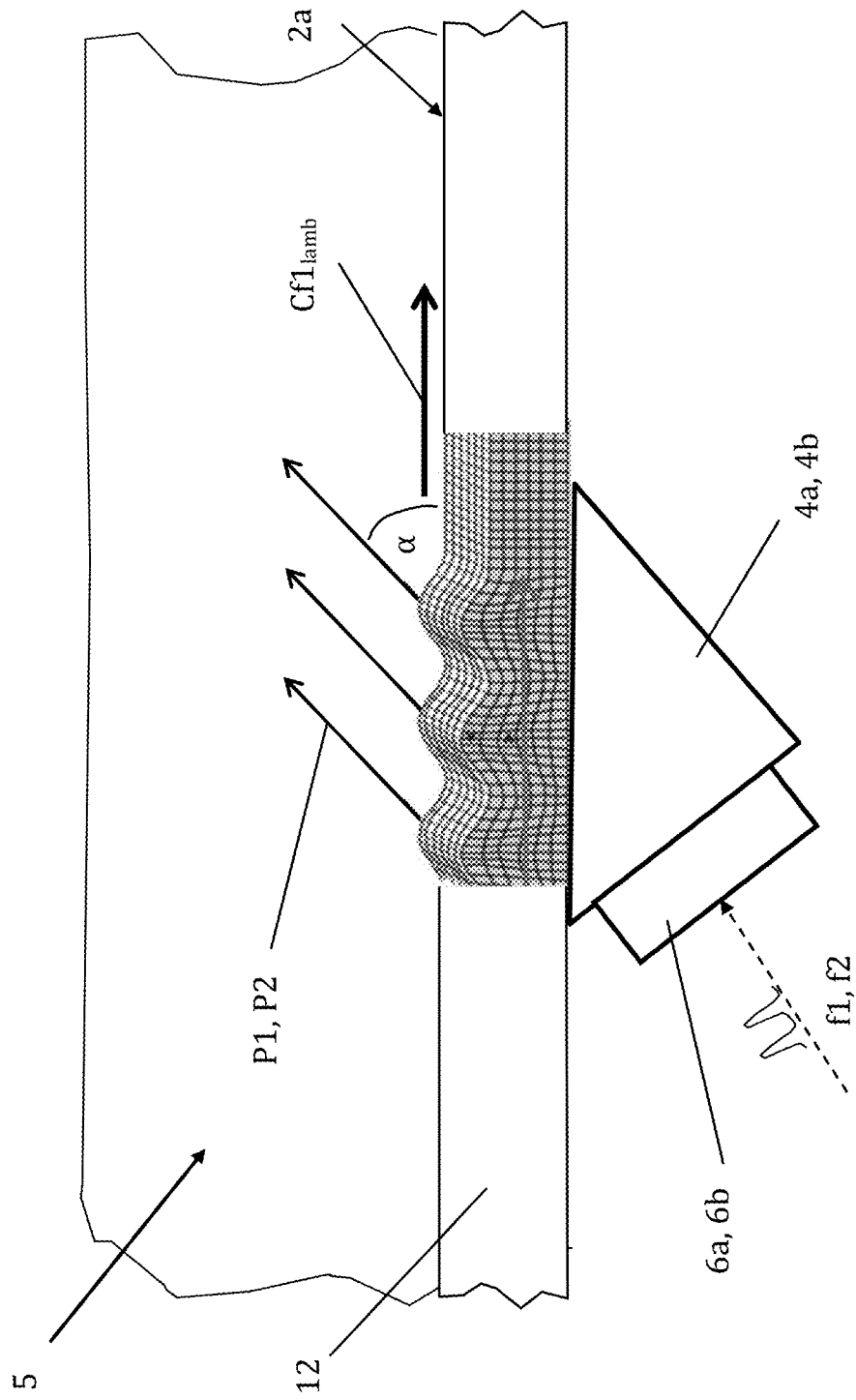
FIG. 7 is a schematic more detailed view of the working principle of the transducers used in the apparatus according to the present invention.

As it is shown in FIGS. 1, 2 and 7, the first transducer TD1 of the preferred embodiment of the invention comprises a first transmitter/receiver unit 6a, which is preferably a known piezo actuator and a first wedge shaped element 4a on which the transmitter/receiver unit 6a is mounted at an angle to the outer surface of the pipe. In the same way, the second transducer TD2 includes a second transmitter/receiver unit 6b which is preferably a known piezo actuator and a second wedge shaped element 4b, on which the second transmitter/receiver unit 6a is mounted at an angle inverse to the one of the first wedge shaped element 4a to the outer surface of the pipe wall 12. In the preferred embodiment of the invention, the first and second transducers (TD1, TD2) are identical.

In the preferred embodiment of the invention, the first sound transmitting element and/or the second sound transmitting element are wedge shaped elements 4a, 4b as described herein before. The wedge shaped elements are preferably plastic wedges or prisms made of e.g. polyurethane, polyamid, polyetherimid or another known plastic material which is able to conduct ultrasonic waves from the transmitter/receiver units 6a, 6b to a contacting area in which the wedge shaped elements 4a, 4b are in contact with the wall 12 of the pipe 2 as shown in FIGS. 1 and 2. In order to improve the transmission of sound ultrasonic vibrations between the wedge shaped elements 4a, 4b and the wall 12 of the pipe 2, a known ultrasonic gel or a layer of soft plastics, preferably silicone rubber, may be arranged between the wedge shaped elements 4a, 4b and the outer wall surface.

As it is further indicated in FIG. 7, the ultrasonic waves generated by the transmitter/receiver units 6a, 6b of the first and second transducer TD1, TD2, when operated as an emitter, are diffracted in the sound transmitting elements 4a, 4b and generate vibrations in the wall 12 of the pipe 2 which in turn generate an ultrasonic wave front which is emitted at an angle $\alpha_1$, $\alpha_2$ to the inner surface 2a of the pipe 2. Due to the frequency dependency of the sonic speed in the wall material of the pipe, which is usually metal/steel, the angle $\alpha_1$, $\alpha_2$ strongly depends on the frequency f1, f2 of the ultrasonic waves which are emitted by the transmitter/receiver units 6a, 6b, so that by tuning the frequency f1, f2 of the transducers (TD1, TD2) over a certain range, e.g. from 100 kHz to 1 MHz, the angel $\alpha_1$, $\alpha_2$ of the ultrasonic waves/pulses P1, P2 emitted from the transducers TD1, TD2 into the fluid 5 can be changed.

The vibrations generated in the wall are typically Lamb waves which can exist in different wave modes having different properties in the interaction with the liquid. A preferable mode to be used for the generation of the emitted beam into the fluid is the fundamental asymmetric Lamb wave mode in the wall which is also called A0-mode. This asymmetric A0 Lamb wave mode provides for the advantage that it shows a strong interaction with the surrounding liquid and thus emits most of its acoustical energy already along a short travel path into the liquid. Alternatively, also other known Lamb wave modes with a strong interaction with the liquid may be used.

Figure 8:
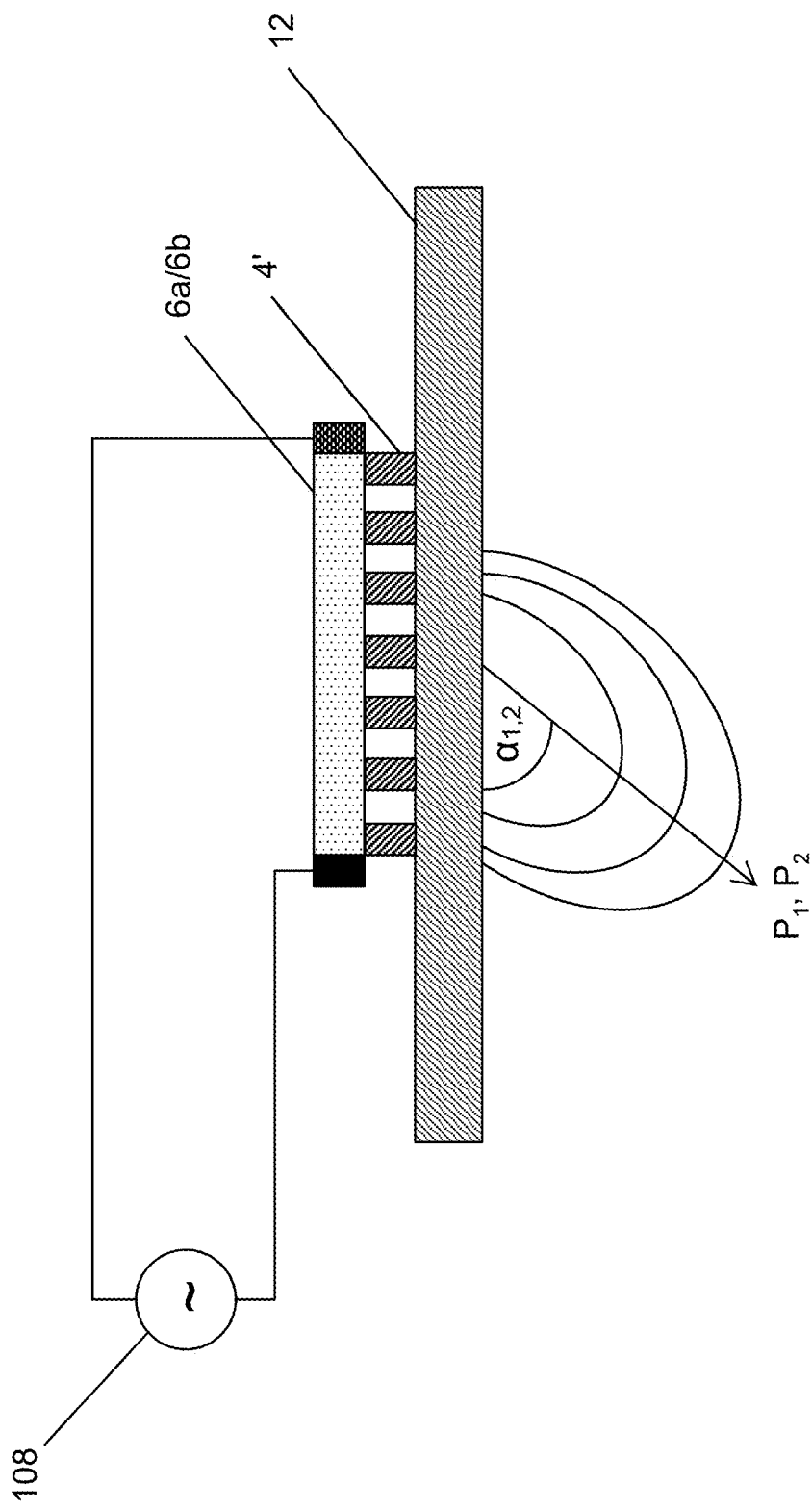
FIG. 8 is a schematic side view of a transmitter/receiver unit in which the sound transmitting element is configured as a mechanical grating.

According to an alternative embodiment of the invention, the transmitter/receiver units 6a, 6b of the first and second transducer TD1, TD2 can comprise a simple piezoelectric element which is mounted to the wall 12 by means of a sound transmitting element which is configured as a mechanical grating 4' that is located in between the piezoelectric element 6a, 6b and the wall 12, as it is shown in FIG. 8. This grating preferably consists of two different materials, e.g. a first sound-transmitting material like metal and a second non-sound transmitting material like air or plastic, which are arranged in a 1-dimensional or 2-dimensional periodic order. Due to the grating 4' the waves/ultrasonic pulses P1, P2 which are generated by the transmitter/receiver units (piezoelectric elements) 6a, 6b can only propagate in one of the materials, e.g. the metal, and are blocked in the other, e.g. the air or plastic, or they propagate with different propagation velocities so that a phase shift of the ultrasonic waves which form the pulses P1, P2 occurs at the wall 12. As applicant has found, this results in a periodical excitation of the acoustic waves in the wall 12, so that only one specific wave front or pulse is emitted at a specific angle $\alpha_1$, $\alpha_2$. By tuning the frequency f1, f2 of the transducers (TD1, TD2) over a certain frequency range, the angle $\alpha_1$, $\alpha_2$ under which the first and second ultrasonic pulses P1, P2 are emitted from the grating 4' into the liquid can be varied, and the angle can be tuned to an angle at which the amplitude of the signal received by the receiving transducer TD2, TD1 has a maximum, as it was set forth herein before with reference to the embodiment in which the sound transmitting elements are configured as wedges 4a, 4b. In this alternative embodiment, the periodicity is preferably selected in such a way that it fits to the wavelength of the required ultrasonic mode in the wall 12, so that as a result preferably only this mode is excited.

Figure 9A:
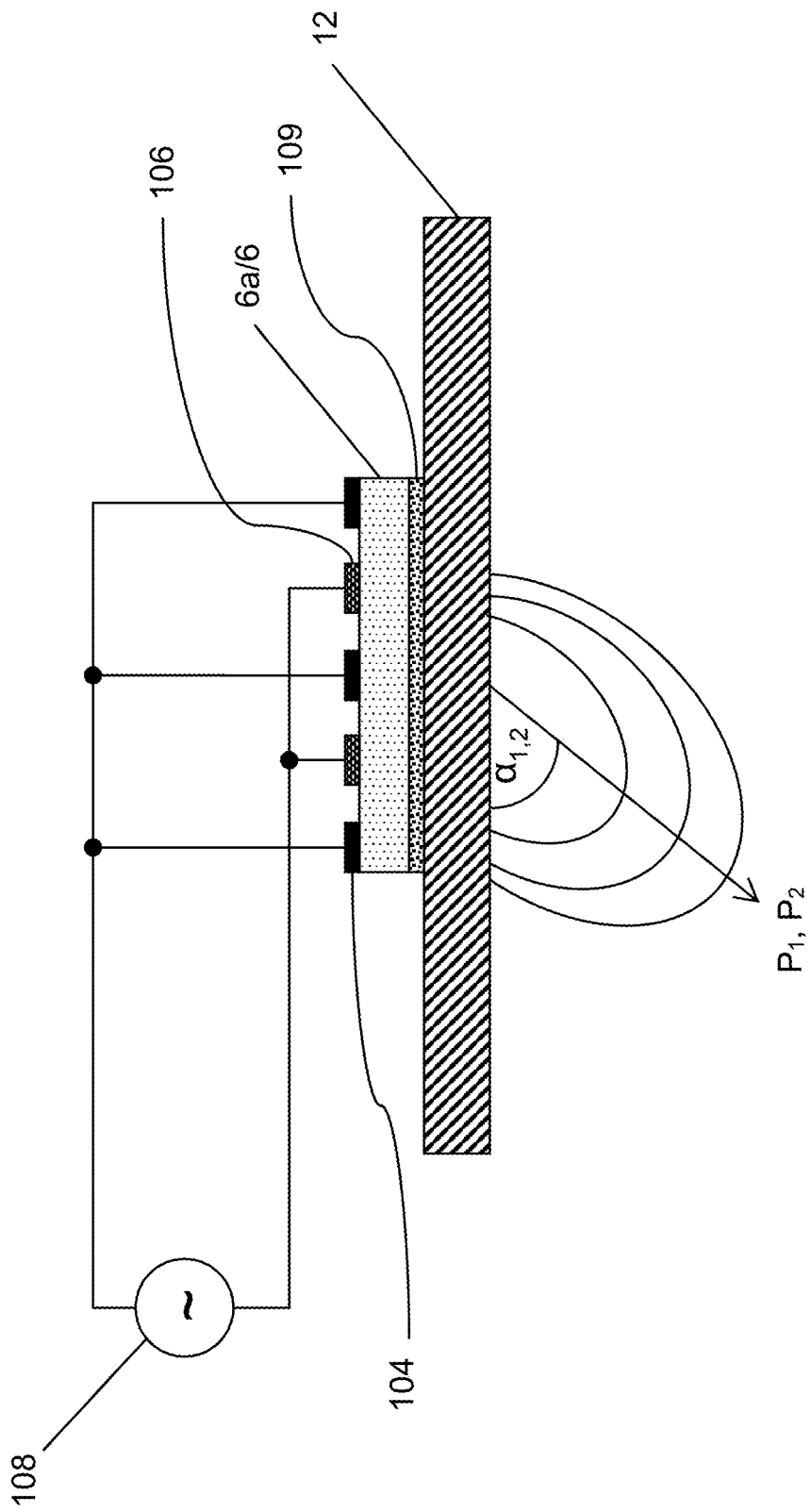
FIG. 9a is a schematic side view of a transmitter/receiver unit in which the sound transmitting element is configured as an electronical grating which is arranged on the piezo electric element of the transmitter/receiver unit.
Figure 9B:
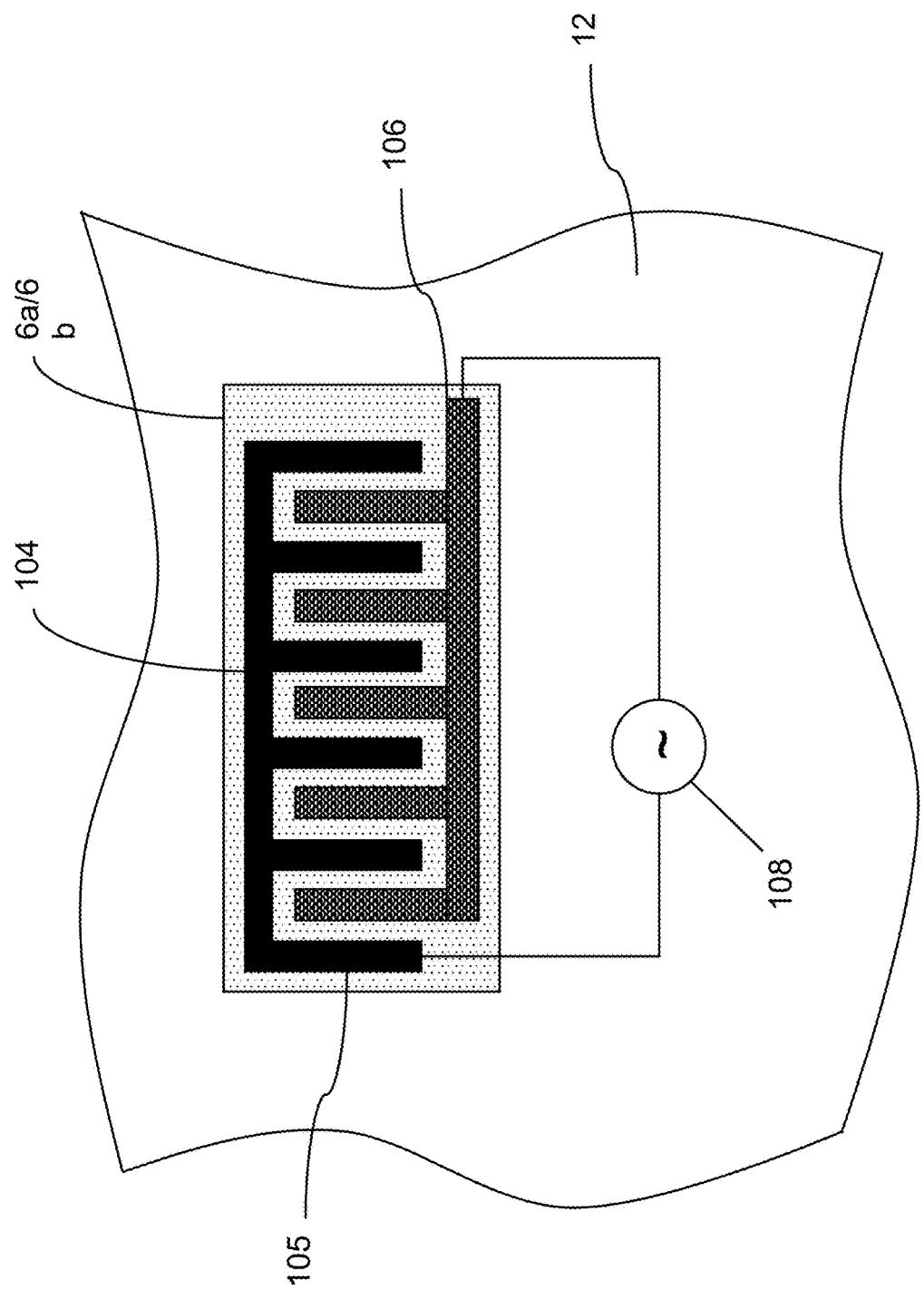
FIG. 9b is a schematic top view of a transmitter/receiver unit of FIG. 9a, and FIG. 10 is a schematic side view of a further embodiment of a transmitter/receiver unit in which the sound transmitting element is configured as an arrangement of opposing electrodes which are independently connected to separate signal generators which can be driven so as to generate ultrasonic waves of substantially the same frequency having a phase shift.

As a further alternative embodiment to the mechanical grating 4', an electronic grating 104 on the piezoelectric element of the transmitter/receiver units 6a, 6b can be used, in which a periodic electrode structure which comprises two or more nested sets of comb shaped electrodes 105, 106 extending into each other is printed on the outer surface of the piezoelectric element of the transmitter/receiver units 6a, 6b as it is shown in FIGS. 9a and 9b. The two different sets of electrodes 105, 106 are connected to a frequency tunable signal generator 108, e.g. an AC-power supply which is part of the control and evaluation unit and which can be tuned to a frequency that generates lamb waves in the material of the wall 12. As applicant has found, the comb shaped arrangement of electrodes 105, 106 also leads to a periodic excitation of acoustic waves in the wall 12 which finally results in ultrasonic pulses P1, P2 that are emitted into the liquid under an angle $\alpha_1$, $\alpha_2$ which strongly depends on the frequency of the signals fed to the first and second transmitter/receiver units 6a, 6b.

As an even further alternative embodiment for a transducer TD1, TD2 which can generate first and second ultrasonic pulses P1, P2 at different emitting angles $\alpha_1$, $\alpha_2$, a plurality of pairs of opposing electrodes 204a, 206b; 204b, 206b; 204c, 206c may be provided on the surface of the piezo electric elements of the transmitter/receiver units 6a, 6b, as it is shown in the exemplary embodiment of FIG. 9 in which 3 pairs of electrodes 204, 206 are shown for demonstrative purposes only. Each pair of electrodes 204, 206 is fed by a separate signal generator 208a to 208c with an individual periodic signal having the same frequency but comprising a phase shift. By tuning the frequency of the signal generators 208a to 208c to a desired lamb frequency and afterwards varying the phase shift between adjacent sets of electrodes, the emitting angle $\alpha_1$, $\alpha_2$ of the superposed wave front which forms the ultrasonic pulses P1, P2 can be varied at a fixed frequency, as it is e.g. known from ultrasound scanning devices for scanning the human body. This embodiment provides for the advantage that the frequency which is fed to the electrodes of the ultrasonic emitter/receiver units 6a, 6b can be set to a desired lamb frequency which fits best for a specific material, and the angle $\alpha_1$, $\alpha_2$ can afterwards be varied until the received pulses P1, P2 have a maximum amplitude by altering the phase shift between the pairs of electrodes 204, 206.

Figure 10:
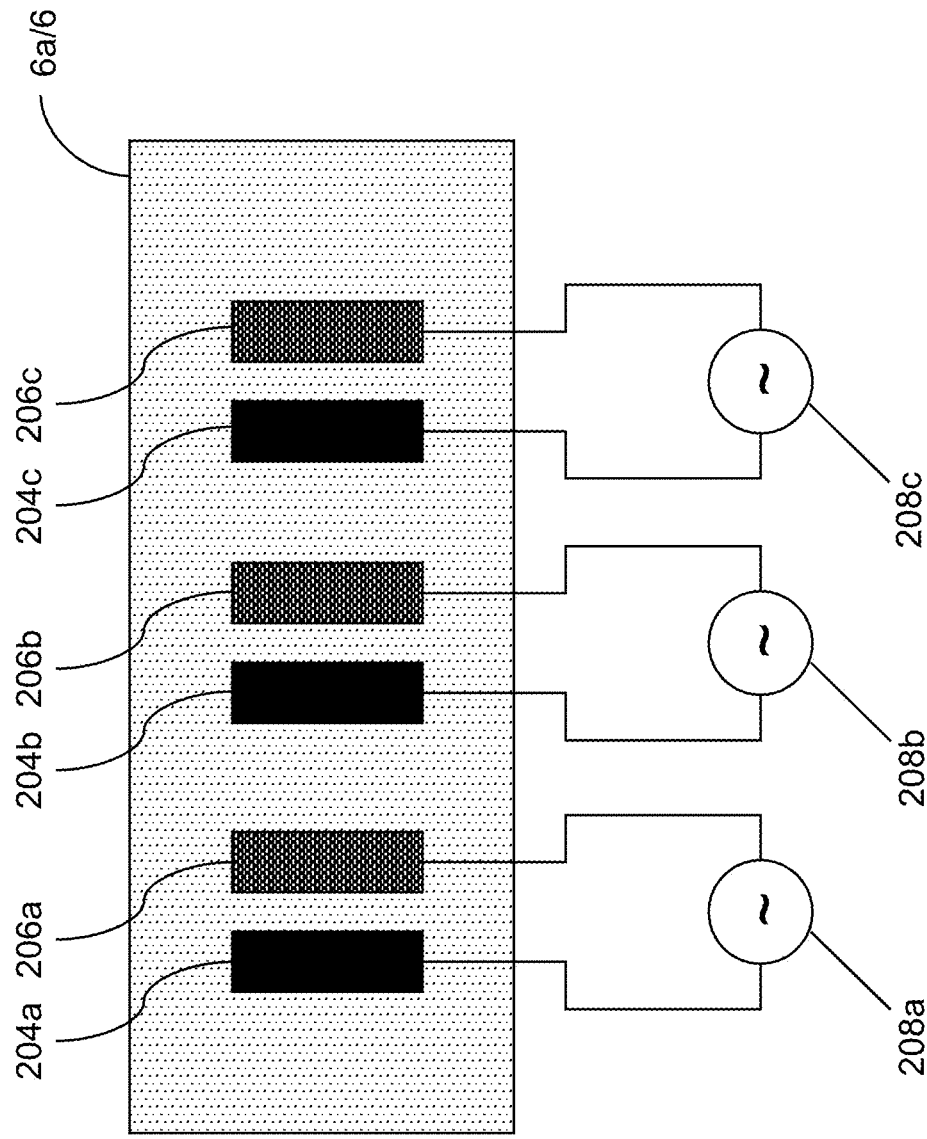

In the afore described embodiments of FIGS. 9 and 10, the sound transmitting element may be a known ultrasonic gel or a flat layer of soft plastics 109, preferably silicone rubber as mentioned herein before.

A further possible variant of a transmitter which is not shown in the drawings may comprise an electromagnetic acoustical transducer (EMAT) in which a more static magnetic field in combination with eddy currents is applied and generated inside the wall material. The interaction between the eddy currents and the magnetic field results in mechanical movements inside the wall which in turn generate ultrasonic waves/pulses propagating in the wall. With this alternative embodiment, a contactless excitation of mechanical waves can be obtained.

Now the embodiments of the method and apparatus of the present invention are described in more detail with regard to FIGS. 1 to 7.

In order to measure the flight time T1 of the first pulses P1 emitted by the first transducer TD1 the angle $\alpha_1$ of the emitted first pulses P1 is altered until a maximum amplitude signal in transducer TD2 is obtained and the flight time of the pulses P altered is measured by the control and evaluation unit 8. In the embodiments of the invention using a transmitter/receiver unit 6a, 6b as shown in FIGS. 1 to 9, the angel $\alpha_1$ at which the amplitude of the received signal in the receiving transducer TD2 becomes a maximum is determined by tuning the frequency of the first emitter/receiver unit 6a to a frequency $f1_{max}$ which generates a maximum signal in the second transducer TD2. In the embodiment of FIG. 10, the angle $\alpha_1$ at which the amplitude of the received signal in the receiving transducer TD2 becomes a maximum is determined by tuning the phase between the signals fed to the pairs of electrodes 204a, 206a; 204b, 206b and 204c, 206c by the separate signal generators 208a, 208b and 208c until the signal received by the second Transducer TD2 becomes a maximum.

Afterwards, the apparatus is operated the other way round as shown in FIG. 2, in order to measure the flight time T2 of ultrasonic pulses P2 which are emitted by the second transducer TD2 and received by the first transducer TD1.

From the known fixed distance between the first transducer TD2 and the second transducer TD2 and the measured flight times T1 and T2 which are different if the fluids 5 is streaming through the pipe 2 with a velocity $V_{med}$, the control and evaluations unit 8, which may include a known micro controller and adapted control software, calculates the speed $V_{med}$ of the fluid 5 in the pipe 2 as $$V_{med} = \frac{L}{2} * \frac{(T2-T1)}{(T1+T2)^2}$$

In order to account for different travelling lengths of the sonic pulses P1, P2 in the wedge shaped elements 4a, 4b, the fixed distance L may be obtained by an initial calibration of the apparatus 1 mounted to a known pipe 2 in which a known fluid is streaming with a known speed $V_{med}$. After calculating and storing the corresponding value L for the (effective distance) from the afore-mentioned mathematical relation in a memory of the micro controller of the control and evaluation unit 8, this effective distance value L may be used for all further applications of the apparatus 1.

Figure 3:
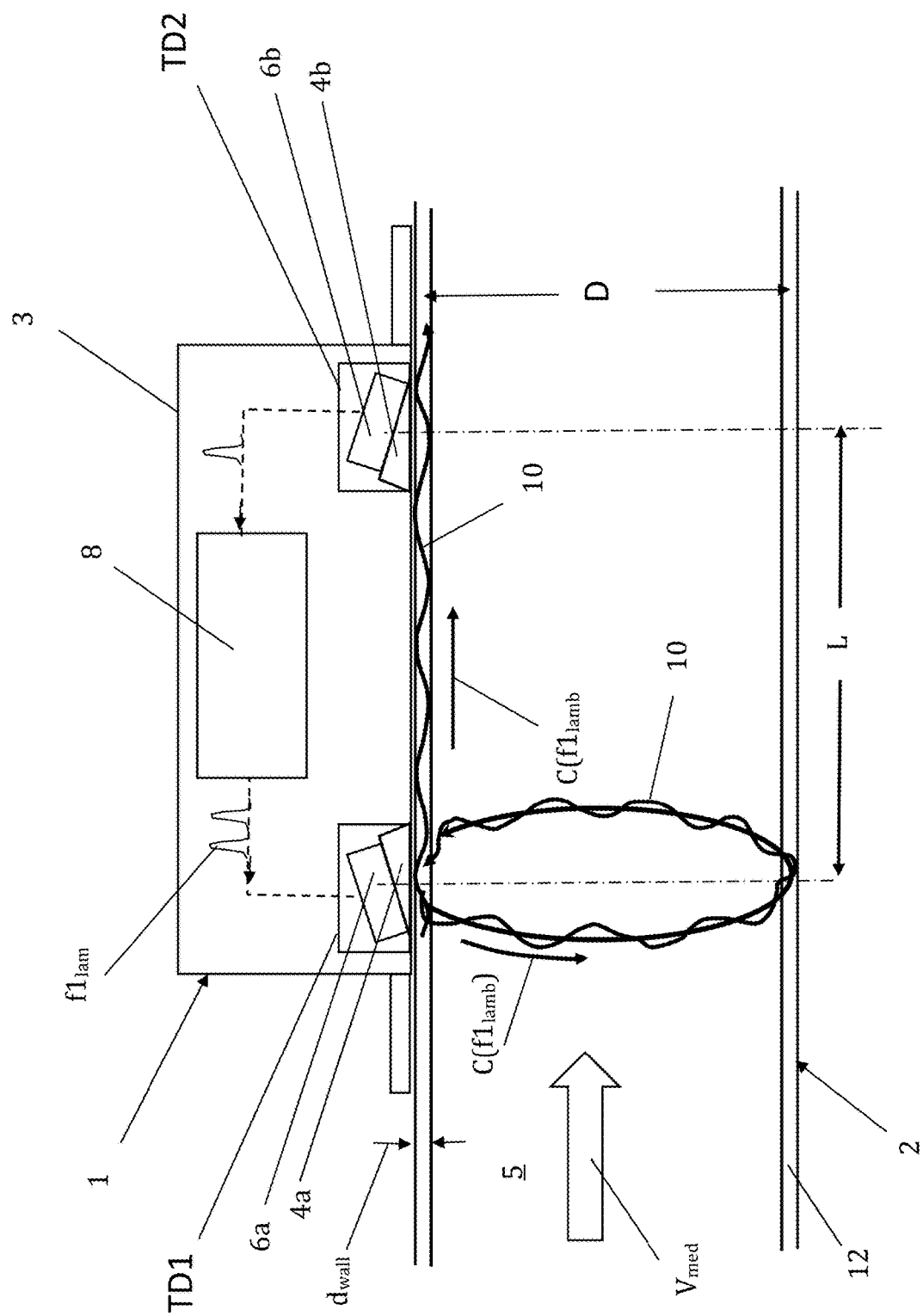
FIG. 3 is a schematic view of the pipe of the arrangement of FIGS. 1 and 2, in which the first transducer generates lamb waves running inside the pipe wall which are received by the second transducer, and alternatively by the first transducer, in order to determine the sonic speed of the lamb waves in the wall material and the perimeter and average diameter of the pipe.

According to a further embodiment of the invention which is shown in FIG. 3, the first transducer TD1 is driven by the control and evaluation unit 8 to generate lamb waves 10 within the wall material of the pipe 2 having a first frequency $f1_{lamb}$. The lamb waves, which are only schematically indicated in FIG. 3 for illustration purposes propagate inside the wall material and are received by the second transducer TD2. The second transducer TD2 which is operated in a receiving mode receives the lamb waves 10 and generates an electronic signal having a frequency $f1_{lamb}$ which is transmitted to the control and evaluation unit 8. From the flight time $T_{flight\ TD1-TD2}$ of the lamb waves 10 travelling in the wall 12 from the first transducer TD1 to the second transducer TD2, the control and evaluation unit 8 calculates the sonic speed $C(f1_{lamb})$ of the lamb waves 10 to $$C(f1_{lamb}) = L/T_{flight\ lamb\ TD1-TD2}$$

which is preferably stored in the memory of the control and evaluation unit 8 in the same way as all other parameters measured.

According to another preferred embodiment of the invention, the first transducer TD1 is further driven in a transmitting/receiving mode in which the transmitter/receiver unit 6a is first operated as a transmitter and transmits a short pulse P1 of the afore-mentioned lamb waves 10 of a known first frequency $f1_{lamb}$. Immediately after sending out the short Pulse P1, the first transducer TD1 is switched to the receiving mode in which the transmitter/receiver unit 6a is operated as a receiver which receives the lamb waves 10 which are travelling around the perimeter U of the pipe 2 in the pipe wall 12.

From the flight time $T_{flight\ lamb\ TD1-TD1}$ of the lamb waves 10 emitted from and received by the first transducer TD1 and preferably the stored value of the sonic speed $C(f1_{lamb})$ of the lamb waves 10 measured before, the control and evaluation unit 8 calculates the perimeter U of the pipe 2 as $$U = C(f1_{lamb}) * (T_{flight\ lamb\ TD1-TD1})$$

and preferably also the diameter D of the pipe as $$D = U/\pi,$$

the values of which are preferably stored in the memory of the control and evaluation unit 8. In this respect, it should be noted that the perimeter U and the diameter D are not the exact perimeter/diameter values of the pipe, but are averaged values of the perimeter/diameter measured at about half way of the wall thickness.

According to a yet further embodiment of the invention the control and evaluation unit 8 determines the volume flow J of the fluid 5 running through the pipe 2 from the measured and stored values of the speed $V_{med}$ of the fluid 5 and diameter D of the pipe 2 as $$J = V_{med} * \pi * D^2/4.$$

According to another object of the present invention, the control and evaluation unit 8 is further adapted to determine the sonic speed $C_{med}$ in the fluid 5 which might be used to identify an unknown fluid or alternatively to determine if the composition of a mixture of two or more different fluids 5 running through the pipe 2 has changed or not. To do so, the control and evaluation unit 8 calculates preferably from measured and stored values of the flight times T1 and T2 and diameter or perimeter the sonic speed to $$C_{med} = \frac{2}{(T1+T2)/2} * \sqrt{\frac{L^2}{4} + D^2}$$

or $$C_{med} = \frac{2}{(T1+T2)/2} * \sqrt{\frac{L^2}{4} + \frac{U^2}{\pi^2}}$$

Although the perimeter U and the diameter D may also be known values for a pipe, the apparatus according to the invention has the advantage that all of the afore-mentioned parameters can be measured without knowing any details about the pipe parameters itself which makes the apparatus highly flexible and allows the device to be used as a mobile, preferably also hand held clamp-on device for different kind of measuring applications.

For these described operation modes an emitting of the acoustical energy into the liquid is, in contrast to the flow speed measurement, of disadvantage. Thus, preferably lamb wave modes with a low interaction with the surrounded liquid are used as e.g. the fundamental symmetric Lamb wave mode (so called S0-mode).

Figure 4:
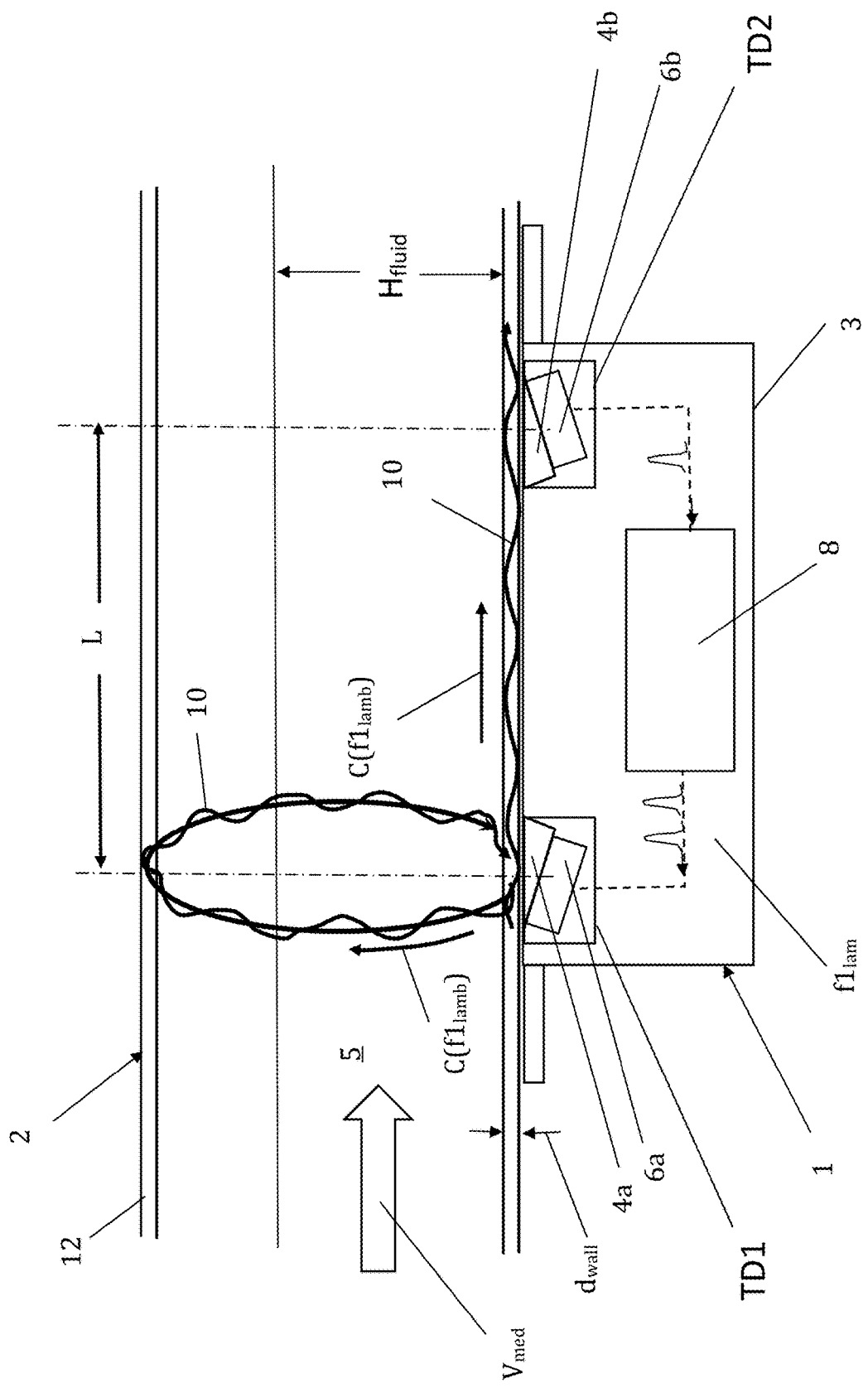
FIG. 4 is a schematic view of a further measuring configuration similar to the one of FIG. 3 in which the apparatus according to the invention is mounted to the bottom of a partially filled pipe when measuring the sonic speed of lamb waves in the wall material and afterwards the perimeter of the pipe.

According to a further embodiment of the invention which is illustrated in FIG. 4, the housing 3 of the apparatus 1 is adapted to be preferably releasable mounted at the bottom surface of a pipe 2, e.g. by means of holding flanges and straps wrapped around the pipe or by magnets or releasable glue or the like. In this application, the apparatus 1 is operated similar to the embodiment of FIG. 3 for measuring the diameter D of the pipe 2 which is completely filled.

Figure 5:
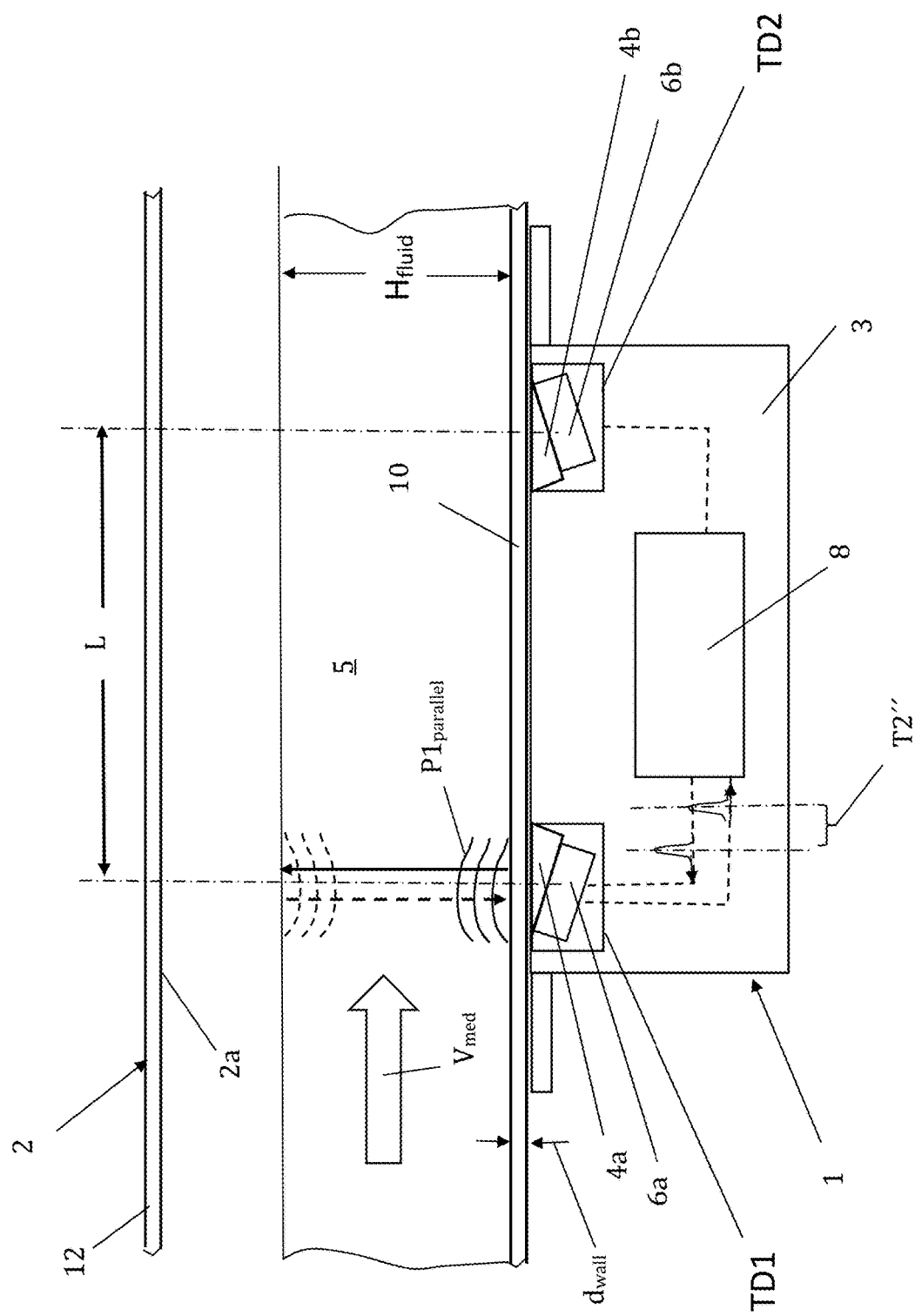
FIG. 5 is a schematic illustration of the configuration of FIG. 4 when measuring the height of the fluid in the pipe on basis of reflections of ultrasonic pulses emitted by one of the transducers in parallel to the diameter of the pipe and reflected at the fluid surface.
Figure 6:
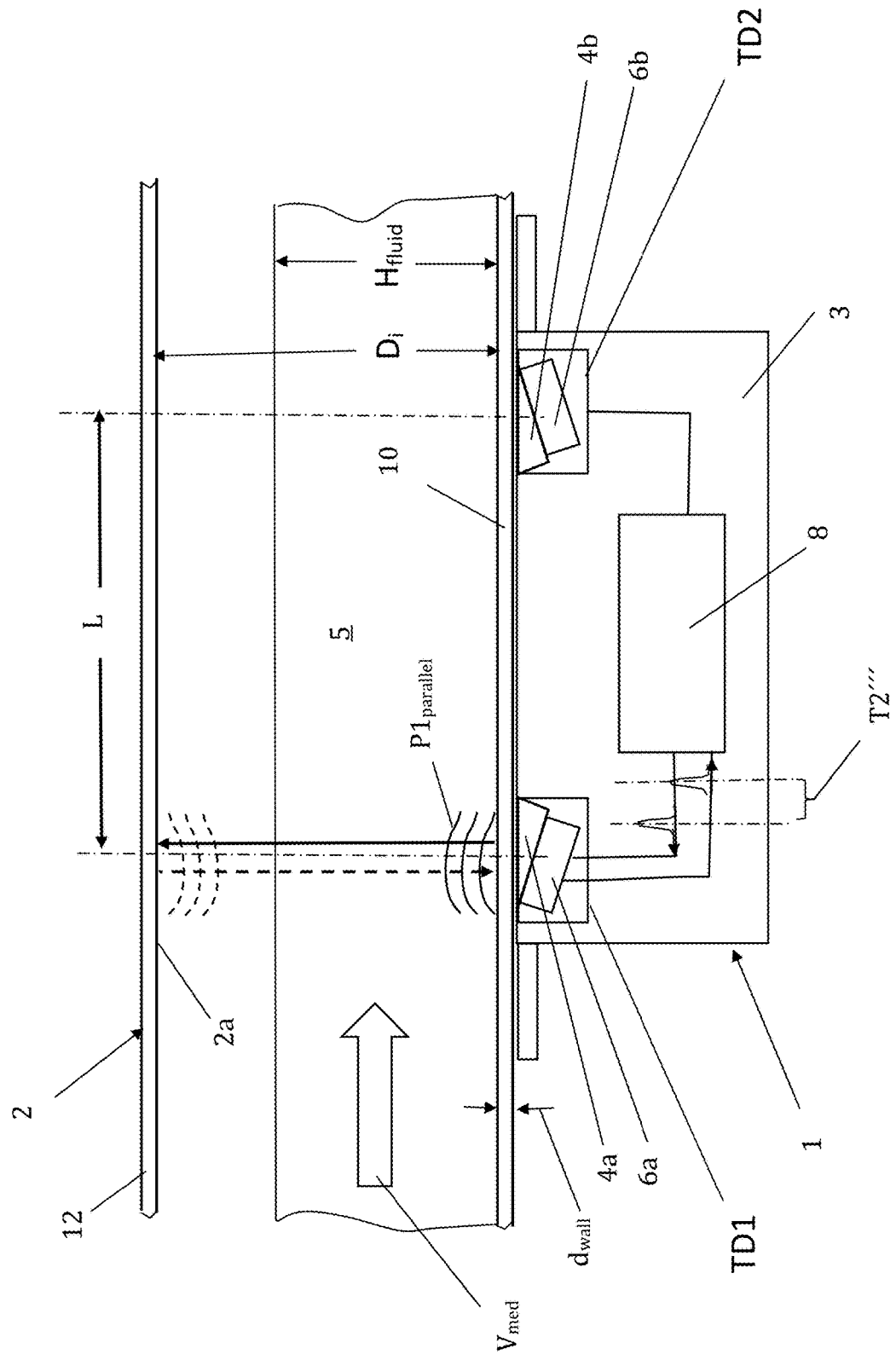
FIG. 6 is a schematic view of the configuration of FIG. 5 when measuring the inner diameter of the pipe on basis of reflections of ultrasonic pulses emitted by one of the transducers in parallel to the diameter of the pipe which are reflected at the opposite inner surface of the pipe.

As it is further shown in FIG. 5, the first transducer TD1 may be configured and controlled by the control and evaluation unit 8 to generate first ultrasonic pulses $P1_{parallel}$ which are emitted in a direction parallel to the diameter D of the pipe 2 and receive reflections of the emitted ultrasonic pulses P1$_{parallel}$ which are reflected at an adjacent inner wall surface 2a and/or at an upper surface 5a of the fluid 5 in a partially filled pipe 2 and/or at the inner wall surface 2a of the pipe 2 which is located opposite to the first transducer TD1, as shown in FIG. 6.

In this measuring application, the control and evaluation unit 8 is further adapted to calculate from the flight time T1', T1" and T1'" of the reflected ultrasonic pulses P1$_{parallel}$ which are received by the first transducer TD1 the wall thickness d$_{wall}$ of the pipe 2 and/or the filling height H$_{fluid}$ of the fluid 5 in a partially filled pipe 2 and/or the inner diameter D$_i$ of the pipe 2 according to the following relations:

$$d_{wall} = C_{wall} * T1'$$

$$H_{fluid} = \frac{1}{2} * C_{med} * T1''; \text{ and}$$

$$D_i = \frac{1}{2} * C_{med} * T1''';$$

wherein

T1' is the flight time of the first ultrasonic pulses P1$_{parallel}$ emitted and received by the first transducer TD1 which are reflected at the inner surface 2a of the pipe wall on the side of the pipe 2 which is opposite of the first transducer TD1, T1" is the flight time of the first ultrasonic pulses P1$_{parallel}$ emitted and received by the first transducer TD1 which are reflected at a surface 5a of the fluid 5 in a partially filled pipe 2, T1'" is the flight time of the first ultrasonic pulses P1$_{parallel}$ emitted and received by the first transducer TD1 which are reflected at the adjacent inner surface 2a of the pipe wall, D$_i$ is the inner diameter of the pipe 2, C$_{med}$ is the sonic speed of the first ultrasonic pulses P1$_{parallel}$ in the fluid 5 which are determined similar to the embodiment of FIGS. 3 and 4 as $$C_{med} = \frac{2}{(T1+T2)/2} * \sqrt{\frac{L^2}{4} + D^2}$$

or $$C_{med} = \frac{2}{(T1+T2)/2} * \sqrt{\frac{L^2}{4} + \frac{U^2}{\pi^2}}$$

and

C$_{wall}$ is the sonic speed of the first ultrasonic pulses P1$_{parallel}$ in the wall material which are emitted by the first transducer TD1 in a direction parallel to the diameter D of the pipe 2 which is previously measured as set forth above with regard to the embodiment of FIG. 3.

With regard to the embodiments described herein before, it should be in the scope of the invention that instead of using the first transducer TD1 for generating the lamb waves 10 and ultrasonic pulses P1$_{parallel}$, also the second ultrasonic transducer TD2 may be employed. This may also include that the ultrasonic pulses P1$_{parallel}$ are generated and received by the first transducer TD1 and the lamb waves 10 running through the wall 2 for measuring the sonic speed in the wall material are generated in the same configuration by the second transducer TD2 and vice versa. This provides for the advantage of an increased measuring speed and a shortened measuring time or even an improved measuring accuracy when repeating the measurements several time and calculating an average value from a series of measured single values.

According to another object of the present invention, a method of measuring the flow velocity V$_{med}$ of a fluid 5 in a pipe 2 comprises the following steps:

attaching an apparatus 1 as described herein before to the outer surface of a linear section of the pipe and aligning the housing 3 such that the predefined distance L between the first and second transducer TD1, TD2 extends in parallel to the longitudinal axis of a linear section of the pipe 2, tuning the first transducer TD1 to an angle which generates a second electronic output signal of a maximum amplitude in the second transducer TD2, preferably by tuning the frequency of the first transducer TD1 and measuring the amplitude of the output signal of the second transducer TD2, measuring the flight time T1 of first ultrasonic pulses P1 travelling from the first transducer TD1 to the second transducer TD2 and measuring the flight time T2 of second ultrasonic pulses P2 travelling from the second transducer TD2 to the first transducer TD1, and calculating the speed V$_{med}$ of the fluid 5 running through the pipe 2 as $$V_{med} = \frac{L}{2} * \frac{(T2-T1)}{(T2+T1)^2}$$

In accordance with another embodiment of the invention the method is characterized by the further method steps of tuning the first transducer TD1 to a first frequency which generates lamb waves 10 within the wall material of the pipe 2 having a first frequency f1$_{lamb}$, measuring the flight time T$_{flight\ TD1-TD2}$ of the lamb waves 10 between the first transducer TD1 and the second transducer TD2 and calculating the sonic speed C(f1$_{lamb}$) of the lamb waves 10 within the wall material as $$C(f1_{lamb}) = L/T_{flight\ lamb\ TD1-TD2}$$

Pursuant to an even further object of the invention, the method comprises the further method steps of tuning the first transducer TD1 to generate lamb waves 10 having the first frequency f1$_{lamb}$, interrupting the generation of the lamb waves 10, running the first transducer TD1 in a receiver mode and measuring the flight time T$_{flight\ lamb\ TD1-TD1}$ of the lamb waves 10 emitted from and received by the first transducer TD1 and calculating the perimeter of the pipe as $$U = C(f1_{lamb}) * (T_{flight\ lamb\ TD1-TD1})$$

and/or calculating the diameter D of the pipe 2 as $$D = C(f1_{lamb}) * (T_{flight\ lamb\ TD1-TD1}) / \pi$$

and/or calculating the speed of the fluid 5 in the pipe 2 as $$C_{med} = \frac{2}{(T1+T2)/2} * \sqrt{\frac{L^2}{4} + \frac{(C(f1lamb)*(T\ flight\ lamb\ TD1-TD1)^2}{\pi^2}}$$

Moreover, the above-described method may comprise the further method steps of mounting the housing 3 at the bottom of the pipe 2, tuning the first transducer TD1 to generate first ultrasonic pulses P1$_{parallel}$ which are emitted in a direction parallel to the diameter D of the pipe 2, interrupting the generation of the ultrasonic pulses $P1_{parallel}$, running the first transducer TD1 in a receiver mode and measuring the flight time T1' of ultrasonic pulses $P1_{parallel}$ which are reflected at an inner wall surface 2a of the pipe 2 which is adjacent the first transducer TD1 and calculating the wall thickness of the pipe 2 as $$d_{wall}=C_{wall}*T1' \text{ and/or}$$

running the first transducer TD1 in a receiver mode and measuring the flight time T1" of ultrasonic pulses $P1_{parallel}$ which are reflected at an upper surface 5a of the fluid 5 in a partially filled pipe 2 and calculating the filling height of the fluid as $$H_{fluid}=\tfrac{1}{2}C_{med}*T1'' \text{ and/or with a higher precision as}$$

$$H_{fluid}=\tfrac{1}{2}C_{med}*T1''-C_{wall}*T1' \text{ and/or}$$

running the first transducer TD1 in a receiver mode and measuring the flight time T1''' of ultrasonic pulses $P1_{parallel}$ which are reflected at the inner wall surface 2a of the pipe 2 which is located opposite to the first transducer TD1 and calculating the inner diameter $D_i$ of the pipe as $$D_i=\tfrac{1}{2}*C_{med}T1''' \text{ and/or}$$

$$D_i=\tfrac{1}{2}*C_{med}*T1'''-C_{wall}*T1'.$$

Moreover, in the embodiment of the invention in which the apparatus 1 is mounted at the bottom of the pipe 2, the diameter obtained from a runtime measurement of lamb waves 10 running in the wall 12 of the pipe may be used to calculate whether a pipe 2 is completely or only partially filled with a liquid medium 5. To do so, the control and evaluation unit 8 calculates if the measured diameter D or Di is equal to $H_{fluid}$ or not. If the measured value of $H_{fluid}$ is smaller than D or $D_i$ the pipe 2 is only partially filled.

The values and parameters which can be measured with the apparatus 1 may be displayed on a display mounted to or included in the housing 3 and/or stored in the memory of the control and evaluation unit 8 and/or may be transmitted to a remote server or central control unit, e.g. via a known data communication network.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LISTING OF REFERENCE NUMERALS

1 Apparatus according to the invention
2 pipe
2a inner surface of pipe
3 housing
4a first sound transmitting element
4b second sound transmitting element
4' mechanical grating
5 fluid
5a surface of the fluid
6a transmitter/receiver unit of first transducer
6b transmitter/receiver unit of second transducer
8 control and evaluation unit
10 lamb waves
12 pipe wall
104 electronic grating
105 comb shaped electrode,
106 comb shaped electrode
108 frequency tunable signal generator
109 sound transmitting element
204a,b,c electrodes in embodiment of FIG. 9
206a,b,c electrodes in embodiment of FIG. 9
208a signal generator connected to first pair of electrodes 204a, 206a
208b signal generator connected to second pair of electrodes 204b, 206b
208c signal generator connected to third pair of electrodes 204c, 206c
J volume flow
TD1 first ultrasonic transducer
TD2 second ultrasonic transducer
L predefined distance
P1 first ultrasonic pulses
P2 second ultrasonic pulses
$\alpha_1$ angel at which first pules are emitted
$\alpha_2$ angel at which second pules are emitted
$f1_{max}$ tuning frequency of first transducer for maximum pulses in second transducer
$f2_{max}$ tuning frequency of second transducer for maximum pulses in first transducer
$V_{med}$ speed of fluid in pipe
T1 flight time of first ultrasonic pulses P1
T2 flight time of second ultrasonic pulses P2
$f1_{lamb}$ frequency of lamb waves emitted by first transducer
$C(f1_{lamb})$ sonic speed of lamb waves in wall
$T_{flight\ TD1\text{-}TD1}$ flight time of lamb waves emitted and received by first transducer
$T_{flight\ TD1\text{-}TD2}$ flight time of lamb waves between first and second transducer
U perimeter of pipe
D diameter of pipe
$P1_{parallel}$ ultrasonic pulses emitted by first transducer parallel to diameter
$D_i$ inner diameter of pipe
$d_{wall}$ thickness of wall
$H_{fluid}$ height of fluid in partially filled pipe
T1' flight time of first ultrasonic pulses $P1_{parallel}$ reflected at inner surface of pipe wall T1" flight time of ultrasonic pulses P1$_{parallel}$ reflected at surface of fluid T1''' flight time of pulses P1$_{parallel}$ reflected at opposite pipe wall C$_{med}$ sonic speed of pulses P1$_{parallel}$ in fluid C$_{wall}$ sonic speed of pulses P1$_{parallel}$ in wall

What is claimed is:

1. An apparatus for measuring a flow velocity of a fluid in a pipe, comprising:
   a housing in which a first ultrasonic transducer and a second ultrasonic transducer are arranged at a predefined distance to each other, the first ultrasonic transducer including a first sound transmitting element and a transmitter/receiver unit mounted thereto which are configured to emit first ultrasonic pulses at different angles, the second ultrasonic transducer being configured to receive the first ultrasonic pulses and generate a first electronic output signal, the second ultrasonic transducer including a second sound transmitting element and a transmitter/receiver unit mounted thereto which are configured to emit second ultrasonic pulses at different angles, the first ultrasonic transducer being configured to receive the second ultrasonic pulses and generate a second electronic output signal; and
   a control and evaluation unit electrically coupled to the first and second transducers, the control and evaluation unit being configured to tune the first transducer to generate a first electronic output signal of a maximum amplitude, and tune the second transducer to generate a second electronic output signal of a maximum amplitude,
   wherein the control and evaluation unit is configured to measure a flight time of the first ultrasonic pulses and a time of flight of the second ultrasonic pulses travelling between the first and second transducer,
   wherein the first transducer is configured to generate lamb waves within a wall material of the pipe having a first frequency,
   wherein the second transducer is configured to receive the lamb waves, and
   wherein the control and evaluation unit is configured to determine a sonic speed C(fl$_{lamb}$) of the lamb waves within the wall material of the pipe from a ratio of a distance L between the first and second transducers and the flight time T$_{flight\ lamb\ TD1-TD2}$ of the lamb waves between the first transducer and the second transducer according to the relation:

$$C(fl_{lamb}) = L / T_{flight\ lamb\ TD1-TD2}.$$

2. The apparatus of claim 1, wherein the control and evaluation unit is configured to determine a speed of the fluid V$_{med}$ running through the pipe according to the following relation:

$$V_{med} = \frac{L}{2} * \frac{(T2-T1)}{(T1+T2)^2},$$

wherein T1 is a flight time of first ultrasonic pulses and T2 is a flight time of second ultrasonic pulses.

3. The apparatus of claim 2, wherein the control and evaluation unit is configured to determine a volume flow J of the fluid running through the pipe by multiplying a measured diameter D of the pipe with a measured speed of the fluid running through the pipe according to the following relation:

$$J = V_{med} * \pi * D^2 / 4,$$

wherein π is 3.1415.

4. The apparatus of claim 1, wherein the first transducer is configured to emit and receive lamb waves having the first frequency running within the wall material of the pipe in a circumferential direction, and
   wherein the control and evaluation unit is configured to determine a perimeter U of the pipe from a product of the sonic speed of the lamb waves within the wall material multiplied with the flight time T$_{flight\ lamb\ TD1-TD1}$ of the lamb waves emitted from and received by the first transducer according to the relation:

$$U = C(fl_{lamb}) * (T_{flight\ lamb\ TD1-TD1}).$$

5. The apparatus of claim 4, wherein the control and evaluation unit is configured to determine a diameter D of the pipe by a quotient of the determined perimeter divided by π, which is 3.1415 according to the following relation:

$$D = U/\pi.$$

6. The apparatus of claim 5, wherein the control and evaluation unit is configured to determine a volume flow J of the fluid running through the pipe by multiplying the measured diameter of the pipe with the measured speed of the fluid V$_{med}$ running through the pipe according to the following relation:

$$J = V_{med} * \pi * D^2 / 4.$$

7. The apparatus of claim 1, wherein the control and evaluation unit is configured to determine a sonic speed C$_{med}$ in the fluid running through the pipe according to the following relation:

$$C_{med} = \frac{2}{(T1+T2)/2} * \sqrt{\frac{L^2}{4} + D^2}$$

or $$C_{med} = \frac{2}{(T1+T2)/2} * \sqrt{\frac{L^2}{4} + \frac{U^2}{\pi^2}},$$

wherein T1 is a flight time of the first ultrasonic pulses emitted by the first transducer in a direction parallel to a diameter D of the pipe and received by the second transducer in a completely filled pipe, T2 is a flight time of the second ultrasonic pulses emitted by the second transducer in a direction parallel to the diameter of the pipe and received by the first transducer in a completely filled pipe, D is a diameter of the pipe, U is a perimeter of the pipe, and π is 3.1415.

8. The apparatus of claim 7, wherein the control and evaluation unit is configured to determine a sonic speed in the fluid from a value of a perimeter as determined as follows:
   wherein the first transducer is configured to emit and receive lamb waves having the first frequency running within the wall material of the pipe in a circumferential direction, and
   wherein the control and evaluation unit is configured to determine a perimeter U of the pipe from a product of the sonic speed of the lamb waves within the wall material multiplied with the flight time $T_{flight\ lamb\ TD1-TD1}$ of the lamb waves emitted from and received by the first transducer according to the relation:

$$U = C(fl_{lamb}) * (T_{flight\ lamb\ TD1-TD1}),$$

or from a value of a diameter as determined as follows:
wherein the first transducer is configured to emit and receive lamb waves having the first frequency running within the wall material of the pipe in a circumferential direction, and
wherein the control and evaluation unit is configured to determine a perimeter of the pipe from a product of the sonic speed of the lamb waves within the wall material multiplied with the flight time of the lamb waves emitted from and received by the first transducer according to the relation:

$$U = C(fl_{lamb}) * (T_{flight\ lamb\ TD1-TD1}),$$

wherein the control and evaluation unit is configured to determine a diameter of the pipe by a quotient of the determined perimeter divided by π, which is 3.1415 according to the following relation:

$$D = U/\pi.$$

9. The apparatus of claim 1, wherein the control and evaluation unit is configured to determine a sonic speed in the fluid from a value of a perimeter as determined as follows:
wherein the first transducer is configured to emit and receive lamb waves having the first frequency running within the wall material of the pipe in a circumferential direction, and
wherein the control and evaluation unit is configured to determine a perimeter U of the pipe from a product of the sonic speed of the lamb waves within the wall material multiplied with the flight time $T_{flight\ lamb\ TD1-TD1}$ of the lamb waves emitted from and received by the first transducer according to the relation:

$$U = C(fl_{lamb}) * (T_{flight\ lamb\ TD1-TD1}),$$

or from a value of a diameter as determined as follows:
wherein the first transducer is configured to emit and receive lamb waves having the first frequency running within the wall material of the pipe in a circumferential direction, and
wherein the control and evaluation unit is configured to determine a perimeter of the pipe from a product of the sonic speed of the lamb waves within the wall material multiplied with the flight time of the lamb waves emitted from and received by the first transducer according to the relation:

$$U = C(fl_{lamb}) * (T_{flight\ lamb\ TD1-TD1}),$$

wherein the control and evaluation unit is configured to determine a diameter D of the pipe by a quotient of the determined perimeter divided by π, which is 3.1415, according to the following relation:

$$D = U/\pi.$$

10. The apparatus of claim 1, wherein the housing is configured to be mounted on a bottom of the pipe,
wherein first transducer is configured to generate first ultrasonic pulses which are emitted in a direction parallel to the diameter of the pipe,
wherein the first transducer is configured to receive reflections of the emitted ultrasonic pulses which are reflected at an adjacent inner wall surface of the pipe and/or at an upper surface of the fluid in a partially filled pipe and/or at the inner wall surface of the pipe which is located opposite to the first transducer, and
wherein the control and evaluation unit is configured to determine from the flight time, of the reflected ultrasonic pulses received by the first transducer, the wall thickness $d_{wall}$ of the pipe and/or a filling height $H_{fluid}$ of a fluid in a partially filled pipe and/or an inner diameter of the pipe according to the following relations:

$$d_{wall} = C_{wall} * T1';$$

$$H_{fluid} = \tfrac{1}{2} * C_{med} * T1''; \text{ and}$$

$$D_i = \tfrac{1}{2} * C_{med} * T1''';$$

wherein T1' is a flight time of the first ultrasonic pulses emitted and received by the first transducer which are reflected at the inner surface of the pipe wall on the side of the pipe which is opposite of the first transducer, T1" is a flight time of the first ultrasonic pulses emitted and received by the first transducer which are reflected at a surface of the fluid in a partially filled pipe, T1''' is a flight time of the first ultrasonic pulses emitted and received by the first transducer which are reflected at the adjacent inner surface of the pipe wall, $D_i$ is an inner diameter of the pipe, $C_{med}$ is a sonic speed of the first ultrasonic pulses in the fluid, and $C_{wall}$ is a sonic speed of the first ultrasonic pulses in the wall material which are emitted by the first transducer in a direction parallel to the diameter of the pipe.

11. The apparatus of claim 1, wherein the housing is releasably mountable to the pipe.

12. The apparatus of claim 1, wherein the first sound transmitting element comprises a wedge shaped element or a mechanical grating which is arranged between the first transmitter/receiver unit and a wall of that the pipe and/or
wherein first transmitter/receiver unit and the first sound transmitting element includes a piezo electric element comprising an electronic grating with electrodes arranged thereon which is configured to contact a wall of the pipe by the sound transmitting element.

13. A method of measuring a flow velocity of a fluid in a pipe, comprising the following steps:
attaching the apparatus of claim 1 to an outer surface of a linear section of the pipe and aligning the housing such that the predefined linear distance L between the first and second transducer extends in parallel to a longitudinal axis of a linear section of the pipe;
tuning the first transducer to an angle which generates an electronic output signal of a maximum amplitude in the second transducer;
tuning the second transducer to an angle which generates an electronic output signal of a maximum amplitude in the first transducer;
measuring a flight time T1 of first ultrasonic pulses travelling from the first transducer to the second transducer and measuring a flight time T2 of second ultrasonic pulses travelling from the second transducer to the first transducer; and calculating a speed of the fluid $V_{med}$ running through the pipe as $$V_{med} = \frac{L}{2} * \frac{(T2-T1)}{(T2+T1)^2}.$$

14. The method of claim 13, further comprising:
tuning the first transducer to a first frequency which generates lamb waves within a wall material of the pipe having a first frequency; and
measuring a flight time $T_{flight\ lamb\ TD1\text{-}TD2}$ of the lamb waves between the first transducer and the second transducer and calculating a sonic speed $C(fl_{lamb})$ of the lamb waves within the wall material as $C(fl_{lamb}) = L/T_{flight\ lamb\ TD1\text{-}TD2}.$

15. The method of claim 14, further comprising:
tuning the first transducer to generate lamb waves having the first frequency;
interrupting the generation of the lamb waves;
running the first transducer in a receiver mode and measuring a flight time $T_{flight\ lamb\ TD1\text{-}TD1}$ of the lamb waves emitted from and received by the first transducer and calculating a perimeter U of the pipe as $U = C(fl_{lamb}) * (T_{flight\ lamb\ TD1\text{-}TD1})$ and/or calculating the diameter D of the pipe as $D = C(fl_{lamb}) * (T_{flight\ lamb\ TD1\text{-}TD1})/\pi$ and/or calculating the speed of the fluid in the pipe as $$C_{med} = \frac{2}{(T1+T2)/2} * \sqrt{\frac{L^2}{4} + \frac{(C(f1lamb)*(Tflight\ lamb\ TD1-TD1)^2}{\pi^2}}.$$

wherein $C_{med}$ is a sonic speed of the first ultrasonic pulses in the fluid and $\pi$ is 3.1415.

16. The method of claim 15, further comprising:
mounting the housing at a bottom of the pipe;
tuning the first transducer to generate first ultrasonic pulses which are emitted in a direction parallel to the diameter of the pipe;
interrupting the generation of the ultrasonic pulses;
running the first transducer in a receiver mode and measuring a flight time T1' of ultrasonic pulses which are reflected at an adjacent inner wall surface of the pipe; and
calculating the wall thickness $d_{wall}$ of the pipe as $d_{wall} = C_{wall} * T1'$ and or running the first transducer in a receiver mode and measuring a flight time T1" of ultrasonic pulses which are reflected at an upper surface of the fluid in a partially filled pipe and calculating the filling height $H_{fluid}$ of the fluid as $H_{fluid} = \frac{1}{2} * C_{med} * T1"$ and/or $H_{fluid} = \frac{1}{2} * T1" - C_{wall} * T1'$ and/or running the first transducer in a receiver mode and measuring a flight time T1''' of ultrasonic pulses which are reflected at the inner wall surface of the pipe which is located opposite to the first transducer and calculating the inner diameter $D_i$ of the pipe as $D_i = \frac{1}{2} * C_{med} * T1'''$ and/or $D_i = \frac{1}{2} * C_{med} * T1''' - C_{wall} * T1'$, wherein $C_{wall}$ is a sonic speed of the first ultrasonic pulses in the wall.

17. The method of claim 13, wherein tuning the first transducer to the angle which generates the electronic output signal of the maximum amplitude in the second transducer comprises tuning the frequency to a frequency.

18. The method of claim 13, wherein tuning the second transducer to the angle which generates the electronic output signal of the maximum amplitude in the first transducer comprises tuning the frequency to a frequency.

* * * * *